US009856155B2

(12) United States Patent
Ng et al.

(10) Patent No.: US 9,856,155 B2
(45) Date of Patent: Jan. 2, 2018

(54) SYSTEM AND METHOD FOR REGULATING CONDUCTIVITY OF COOLING WATER FROM A COOLING WATER RECIRCULATION SYSTEM

(71) Applicant: INNOVATIVE POLYMERS PTE. LTD., Singapore (SG)

(72) Inventors: Bee Keong Ng, Singapore (SG); Sue Lin Alfred Lee, Singapore (SG)

(73) Assignee: INNOVATIVE POLYMERS PTE. LTD., Singapore (SG)

( * ) Notice: Subject to any disclaimer, the term of this patent is extended or adjusted under 35 U.S.C. 154(b) by 290 days.

(21) Appl. No.: 14/440,588

(22) PCT Filed: Nov. 5, 2012

(86) PCT No.: PCT/SG2012/000420
§ 371 (c)(1),
(2) Date: May 4, 2015

(87) PCT Pub. No.: WO2014/070104
PCT Pub. Date: May 8, 2014

(65) Prior Publication Data
US 2015/0266754 A1 Sep. 24, 2015

(51) Int. Cl.
*C02F 1/46* (2006.01)
*C02F 1/461* (2006.01)
(Continued)

(52) U.S. Cl.
CPC ........ *C02F 1/46104* (2013.01); *C02F 1/4602* (2013.01); *C25D 11/024* (2013.01);
(Continued)

(58) Field of Classification Search
CPC ................ C02F 1/46104; C02F 1/4602; C02F 2201/4614; C02F 2201/46135;
(Continued)

(56) References Cited

U.S. PATENT DOCUMENTS

2008/0115925 A1 5/2008 Tanaka et al.
2010/0219082 A1* 9/2010 Diaz Gonzalez Alcocer ............... C02F 1/5245 205/743
2011/0120887 A1 5/2011 Taguchi et al.

FOREIGN PATENT DOCUMENTS

TW M427550 U 4/2004

OTHER PUBLICATIONS

International Search Report, dated Jan. 29, 2013 for corresponding International Application No. PCT/SG2012/000420.
(Continued)

*Primary Examiner* — Arun S Phasge
(74) *Attorney, Agent, or Firm* — Intellectual Property Law Group LLP

(57) ABSTRACT

There is provided a system and method for regulating conductivity of cooling water in a recirculation route of a cooling water recirculation system through which the cooling water is circulated for removing scale from the cooling water. The system comprises an electrolytic device connectable to the cooling water recirculation system for performing electrolysis on the cooling water and a controller. The controller is for controlling the electrolysis of the cooling water in an electrolytic chamber of the electrolytic device for depositing ions in the cooling water as scale on the surface of one of a pair of electrodes of the electrolytic device and for dislodging the scale deposited thereon, monitoring a value of voltage and a value of current between the pair of electrodes, calculating a conductivity of the cooling water based on the monitored values of voltage and current, and regulating an amount of discharge of the cooling water from the electrolytic chamber based on the calculated conductivity of the cooling water, whereby the scale is removed with the cooling water that is being discharged and the (Continued)

cooling water that is being electrolyzed is directed back to the recirculation route of the cooling water recirculation system for circulation.

24 Claims, 6 Drawing Sheets

(51) Int. Cl.
    *C25D 11/02*     (2006.01)
    *C25D 11/34*     (2006.01)
    *C02F 103/02*     (2006.01)
    *F16L 58/00*     (2006.01)

(52) U.S. Cl.
    CPC .... *C25D 11/34* (2013.01); *C02F 2001/46119* (2013.01); *C02F 2103/023* (2013.01); *C02F 2201/4613* (2013.01); *C02F 2201/4614* (2013.01); *C02F 2201/46135* (2013.01); *C02F 2201/46155* (2013.01); *C02F 2209/02* (2013.01); *C02F 2209/05* (2013.01); *C02F 2301/046* (2013.01); *C23F 2213/21* (2013.01); *C23F 2213/31* (2013.01); *F16L 58/00* (2013.01)

(58) Field of Classification Search
    CPC ............ C02F 2209/05; C02F 2301/046; C02F 2209/02; C02F 2201/46155; C02F 2201/4613; C02F 2103/023; C02F 2001/46119; C25D 11/34; C25D 11/024
    See application file for complete search history.

(56) References Cited

OTHER PUBLICATIONS

Written Opinion of the ISA, dated Jan. 29, 2013 for corresponding International Application No. PCT/SG2012/000420.
International Preliminary Report on Patentability dated Oct. 28, 2014 for corresponding International Application No. PCT/SG2012/000420.
European Search Report, dated Jun. 28, 2016 for corresponding European Application No. EP12887335.3.
Taiwan Search Report, dated Jul. 5, 2016 for corresponding Taiwan Application No. 102140393.

* cited by examiner

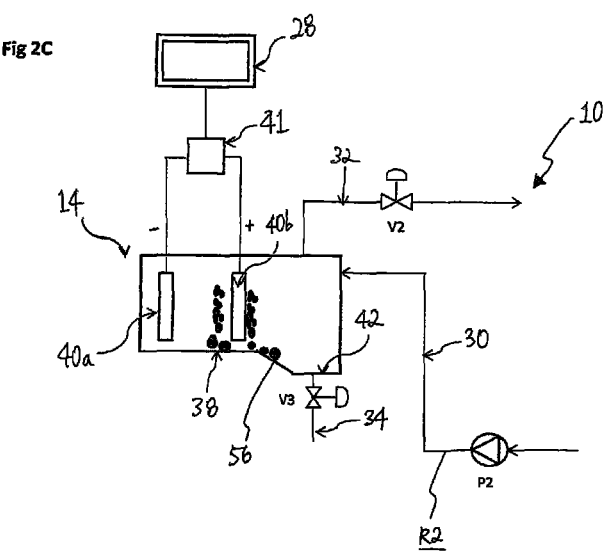
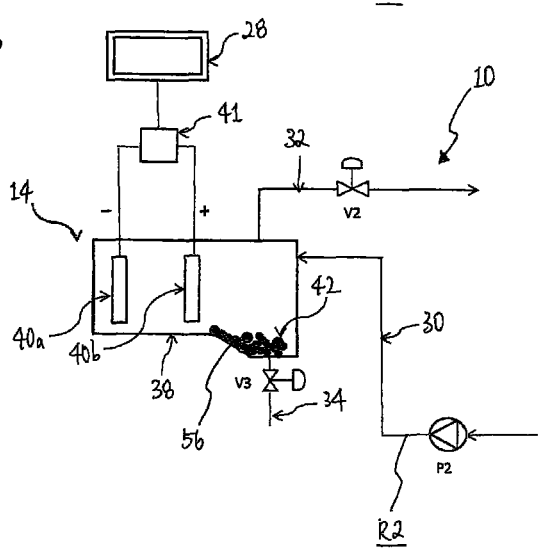

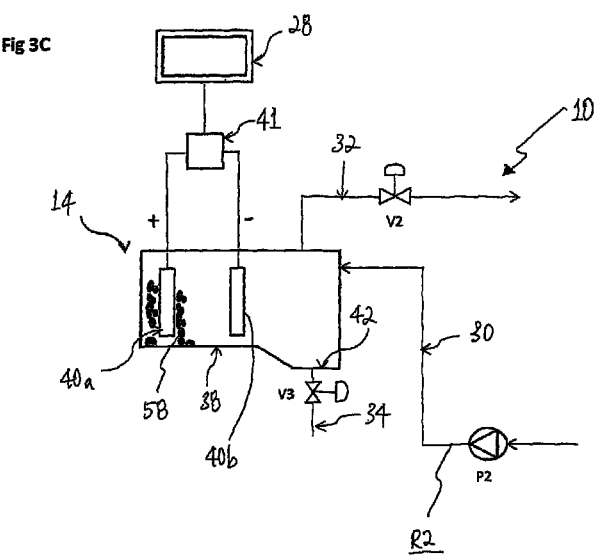
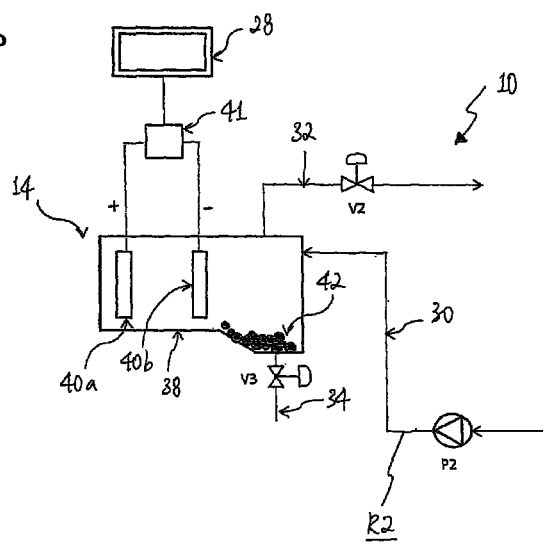

SYSTEM AND METHOD FOR REGULATING CONDUCTIVITY OF COOLING WATER FROM A COOLING WATER RECIRCULATION SYSTEM

FIELD

The present invention relates to a system and method for regulating conductivity of cooling water from a cooling water recirculation system for removing scale from the cooling water.

BACKGROUND

In industries and commercial buildings where heat is removed by heat exchangers, chillers or the like, the warm water is cycled through a cooling tower to be cooled and then re-circulated. Because of evaporation, the dissolved solids in the water become concentrated.

The sparingly soluble salts like calcium carbonate and magnesium carbonate may begin to deposit on pipes, similarly algae and/or microorganisms may multiply, clogging up the passage and heat exchanger tubes and reducing the heat transfer efficiency.

In an attempt to maintain the heat transfer efficiency, chemicals such as biocides, anti-scalant and anti-corrosion have been traditionally used. This will require disposal of large volumes of water containing toxic chemicals.

With the increasing ecological and environmental awareness and safety concerns, alternative and sustainable methods are now emphasized and sought after.

A recent method of limiting scale deposition and microorganism multiplication are achieved by electrolysis, wherein a pair of electrodes is used for depositing mineral contents contained in the cooling water as precipitated scale and dislodging such scale by electrode polarity reversal at a predetermined time interval, thereby limiting the buildup of scale. In addition, chlorine produced in the electrolytic process has a sterilization effect in the cooling water, thus enabling control of algae and/or microorganism multiplication. In this way, the attachment of scale and microorganisms can be limited without using any chemical and the cycle of concentration can be increased to lower water wastage.

However, where the conductivity of the cooling water exceeds a threshold value, the device for conducting the electrolytic process is unable to work, for example in a situation like an abrupt increase in the hardness of the cooling water caused by the intense evaporation of the water. In order to deal with this problem, the whole system has to be stopped and the entire cooling water has to be changed. This will cause excessive water wastage and disruption of the system that will result in greater energy wastage due to restarting of the system. In addition, due to the fact that the conductivity cannot be controlled, the water may be over or under electrolyzed. Over electrolyzing may cause pipe leakage due to corrosion. High amperage can reduce the life span of the electrodes and cause unnecessary waste of electricity. On the other hand, under electrolyzing may degrade descaling performance.

An object of the present invention is to ameliorate at least one of the above-mentioned problems.

SUMMARY

In accordance with one aspect of the present invention, there is provided a system for regulating conductivity of cooling water in a recirculation route of a cooling water recirculation system through which the cooling water is circulated for removing scale from the cooling water, comprising:

an electrolytic device connectable to the cooling water recirculation system for performing electrolysis on the cooling water, the electrolytic device having an electrolytic chamber for receiving the cooling water, a pair of electrodes disposed in the electrolytic chamber and a power source for applying a voltage between the pair of electrodes; and a controller connected to the power source, for:
controlling the electrolysis of the cooling water in the electrolytic chamber for depositing ions in the cooling water as scale on the surface of one of the pair of electrodes and for dislodging the scale deposited thereon;
monitoring a value of voltage and a value of current between the pair of electrodes;
calculating a conductivity of the cooling water based on the monitored values of voltage and current; and
regulating an amount of discharge of the cooling water from the electrolytic chamber based on the calculated conductivity of the cooling water,
whereby the scale is removed with the cooling water that is being discharged and the cooling water that is being electrolyzed is directed back to the recirculation route of the cooling water recirculation system for circulation.

Preferably, the controller comprises a switching device for switching the polarities of the pair of electrodes for dislodging the scale deposited on the surface of either one of the pair of electrodes.

Preferably, the switching device comprises a timer for alternately switching the polarities of the pair of electrodes at a predetermined time interval.

Preferably, the controller further comprises a conductivity device for monitoring the value of voltage and the value of current between the pair of electrodes and for calculating the conductivity of the cooling water based on the monitored values of voltage and current.

Preferably, the conductivity device regulates the amount of discharge of the cooling water from the electrolytic chamber by regulating the duration of discharge of the cooling water based on the calculated conductivity of the cooling water.

Preferably, the conductivity device increases the duration of discharge of the cooling water when the calculated conductivity of the cooling water exceeds a predetermined value of conductivity, and decreases the duration of discharge of the cooling water when the calculated conductivity of the cooling water falls below the predetermined value of conductivity.

Preferably, the system further comprises a discharge outlet at the base of the electrolytic chamber for discharging the scale and the cooling water.

Preferably, the system further comprises an inflow line through which the cooling water flows into the electrolytic chamber of the electrolytic device, and an outflow line through which the cooling water that is being electrolyzed flows out from the electrolytic chamber and back to the recirculation route of the cooling water recirculation system for circulation.

Preferably, the system further comprises a conductivity probe provided along the outflow line for regulating current applied for electrolysis of the cooling water.

Preferably, the conductivity probe regulates the current applied for electrolysis of the cooling water by measuring a conductivity of the cooling water along the outflow line and providing an input of the measured conductivity to the controller for regulating the current applied for electrolysis based on the input of the measured conductivity.

Preferably, the controller further comprises an auto mechanism for receiving the input of the measured conductivity and regulating the current applied for electrolysis of the cooling water based on the input of the measured conductivity to prevent over or under electrolyzing the cooling water.

Preferably, the auto mechanism increases the current applied for electrolysis of the cooling water when the input of the measured conductivity received from the conductivity probe exceeds a predetermined value of conductivity, and decreases the current applied for electrolysis of the cooling water when the input of the measured conductivity received from the conductivity probe falls below the predetermined value of conductivity.

Preferably, the predetermined value of conductivity is in the range of 700 to 2500 μS/cm.

Preferably, the system further comprises a temperature sensor provided in the electrolytic chamber for measuring a temperature in the electrolytic chamber.

Preferably, the conductivity of the cooling water is temperature compensated to 25° C.

In accordance with another aspect of the present invention, there is provided a method for regulating conductivity of cooling water in a recirculation route of a cooling water recirculation system through which the cooling water is circulated for removing scale from the cooling water, comprising the steps of:
- intaking the cooling water into an electrolytic chamber of an electrolytic device having a pair of electrodes disposed in the electrolytic chamber;
- applying a voltage between the pair of electrodes;
- controlling the electrolysis of the cooling water in the electrolytic chamber for depositing ions in the cooling water as scale on the surface of one of the pair of electrodes and for dislodging the scale deposited thereon;
- monitoring a value of voltage and a value of current between the pair of electrodes;
- calculating a conductivity of the cooling water based on the monitored values of voltage and current; and
- regulating an amount of discharge of the cooling water from the electrolytic chamber based on the calculated conductivity of the cooling water,
- whereby the scale is removed with the cooling water that is being discharged and the cooling water that is being electrolyzed is directed back to the recirculation route of the cooling water recirculation system for circulation.

Preferably, the step of controlling the electrolysis of the cooling water comprises switching the polarities of the pair of electrodes for dislodging the scale deposited on the surface of either one of the pair of electrodes.

Preferably, the step of controlling the electrolysis of the cooling water further comprises alternately switching the polarities of the pair of electrodes at a predetermined time interval.

Preferably, the step of regulating the amount of discharge comprises regulating the duration of discharge of the cooling water based on the calculated conductivity of the cooling water.

Preferably, the step of regulating the amount of discharge further comprises the step of increasing the duration of discharge of the cooling water when the calculated conductivity of the cooling water exceeds a predetermined value of conductivity, and decreasing the duration of discharge of the cooling water when the calculated conductivity of the cooling water falls below the predetermined value of conductivity.

Preferably, the scale is removed with the cooling water being discharged from the electrolytic chamber via a discharge outlet provided at the base of the electrolytic chamber.

Preferably, the step of intaking the cooling water into the electrolytic chamber is carried out via an inflow line, and the cooling water that is being electrolyzed is directed back to the recirculation route of the cooling water recirculation system from the electrolytic chamber for circulation via an outflow line.

Preferably, the method further comprises regulating current applied for electrolysis of the cooling water.

Preferably, the current applied for electrolysis of the cooling water is regulated by measuring a conductivity of the cooling water along the outflow line and providing an input of the measured conductivity for regulating the current applied for electrolysis based on the input of the measured conductivity.

Preferably, the method further comprises receiving the input of the measured conductivity and regulating the current applied for electrolysis of the cooling water based on the input of the measured conductivity to prevent over or under electrolyzing the cooling water.

Preferably, the method further comprises increasing the current applied for electrolysis of the cooling water when the input of the measured conductivity exceeds a predetermined value of conductivity, and decreasing the current applied for electrolysis of the cooling water when the input of the measured conductivity falls below the predetermined value of conductivity.

Preferably, the predetermined value of conductivity is in the range of 700 to 2500 μS/cm.

Preferably, the method further comprises measuring a temperature in the electrolytic chamber.

Preferably, the conductivity of the cooling water is temperature compensated to 25° C.

The system and method provided may have the advantage of allowing the system to run continuously where the conductivity of the cooling water exceeds a threshold value and may further save water and/or electricity, prevent pipe leakage and/or prolong the life span of the electrodes.

Other aspects and advantages of the invention will become apparent to those skilled in the art from a review of the ensuing description, which proceeds with reference to the following illustrative drawings of preferred embodiments.

BRIEF DESCRIPTION OF THE DRAWINGS

The present invention will now be described, by way of illustrative example only, with reference to the accompanying drawings, of which:

FIG. 2C is a schematic illustration of the system of FIG. 2B which shows a polarity change in the first and second electrodes and the deposit of scale being dislodged from the surface of the second electrode.

FIG. 2D is a schematic illustration of the system of FIG. 2C which shows the dislodged scale being collected at the conical hopper of the electrolytic chamber.

FIG. 3C is a schematic illustration of the system of FIG. 3B which shows a polarity change in the first and second electrodes and the deposit of scale being dislodged from the surface of the first electrode.

FIG. 3D is a schematic illustration of the system of FIG. 3C which shows the dislodged scale being collected at the conical hopper of the electrolytic chamber.

DETAILED DESCRIPTION OF PREFERRED EMBODIMENTS

In accordance with an aspect of an embodiment of the invention, there is described a system for regulating conductivity of cooling water in a recirculation route of a cooling water recirculation system through which the cooling water is circulated for removing scale from the cooling water. The system is for use with the cooling water recirculation system.

Figure 1A:
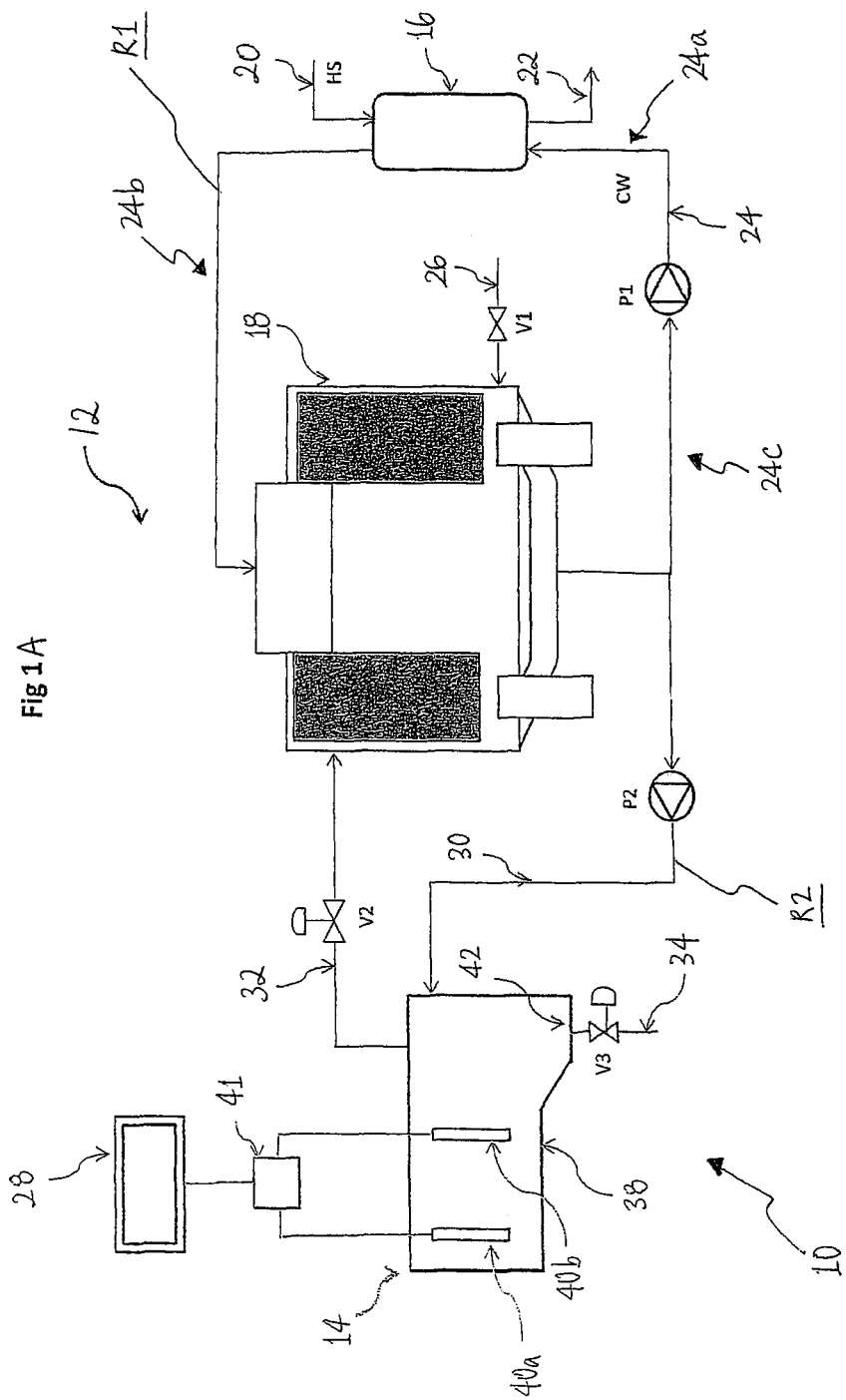
FIG. 1A is a schematic illustration of a system in use with a cooling water recirculation system for regulating conductivity of cooling water in a recirculation route of the cooling water recirculation system through which the cooling water is circulated for removing scale from the cooling water.
Figure 1B:
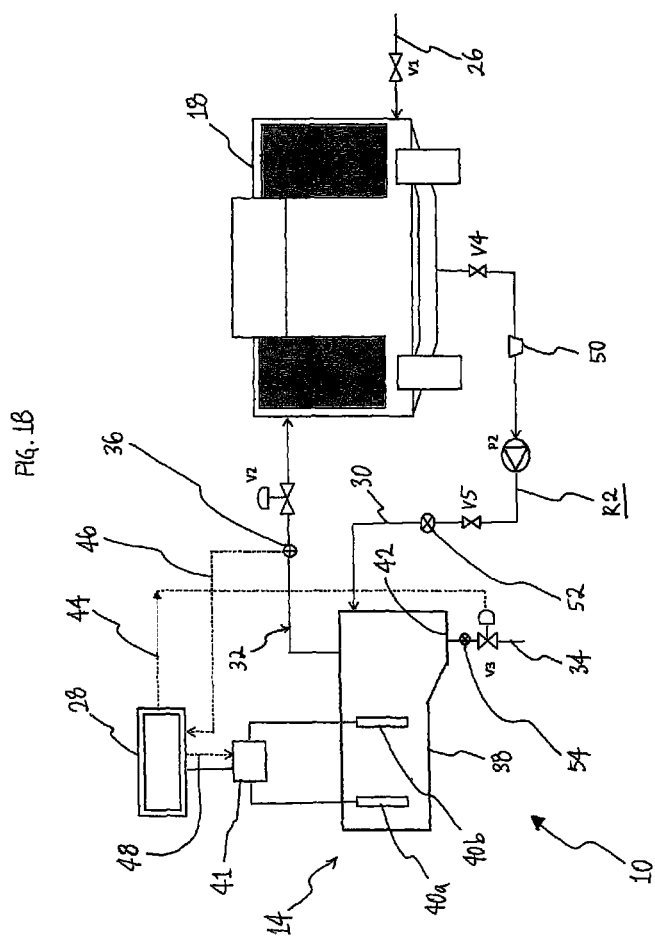
FIG. 1B is another schematic illustration of the system of FIG. 1A in use with the cooling water recirculation system for regulating conductivity of cooling water in the recirculation route of the cooling water recirculation system through which the cooling water is circulated for removing scale from the cooling water.

FIGS. 1A and 1B show a system 10 in use with a cooling water recirculation system 12 for regulating conductivity of cooling water in a recirculation route R1 of the cooling water recirculation system 12 for removing scale from the cooling water (not shown). The cooling water is indicated as CW in FIG. 1A. The cooling water recirculation system 12 comprises a heat exchanger 16, a cooling tower 18, a pump P1, a valve V1, and pipes 20, 22, 24, 26. The recirculation route R1 is in a looped form and is formed by the heat exchanger 16, the cooling tower 18 and the pipe 24, which connects the heat exchanger 16 to the cooling tower 18.

The pipe 20 is connected to a portion of the heat exchanger 16 at one end, and is for receiving a hot stream of water indicated as HS in FIG. 1A and for directing the hot stream of water into the heat exchanger 16 for cooling thereof. The other end of the pipe 20 is connected to a source (not shown) of the hot stream of water, such as a chiller plant, the production floor of a factory, air conditioners, a part of any industrial or commercial buildings where heat removal is required, or the like.

Similarly for the pipe 22, one of its ends is connected to a portion of the heat exchanger 16. However this portion of the heat exchanger 16 is located opposite the portion where the one end of the pipe 20 is connected to. The other end of the pipe 22 is connected to a part of the source where the cooled hot stream of water is being returned to (not shown). This configuration allows the pipe 22 to receive the hot stream of water that is cooled by the heat exchanger 16 and to direct the cooled hot stream of water back to the appropriate part of the source.

The heat exchanger 16 cools the hot stream of water by transferring the heat from the hot stream of water to another medium, which in this embodiment is known as the cooling water, indicated as CW in FIG. 1A. The two media may be separated so that they never mix or they may be in direct contact. In this embodiment, the hot stream of water and the cooling water is separated by tubes (not shown) in the heat exchanger 16.

The cooling water is passed through the heat exchanger 16 via a first portion of the pipe 24a. Inside the heat exchanger 16, the heat from the hot stream of water is transferred to the cooling water. The cooling water, which now carries the heat from the hot stream of water, is directed to the cooling tower 18 via a second portion of the pipe 24b for cooling or removal of the heat that has been transferred thereto. After passing through the cooling tower 18 and being cooled, the cooling water exits the cooling tower 18 through a third portion of the pipe 24c and is pumped back to the first portion of the pipe 24a via the pump P1 and directed back to the heat exchanger 16.

During cooling of the cooling water in the cooling tower 18, evaporation takes place which causes dissolved solids, ions and/or sparingly soluble salts such as calcium carbonate present in the cooling water to be concentrated. To make up for the water loss through evaporation, fresh water is fed into the cooling tower 18 by the pipe 26 through the valve V1. The valve V1 can be a float operated valve or the like and is for ensuring that the volume of the cooling water being circulated in the recirculation route R1 is fixed at all times.

Although fresh water is fed into the cooling tower 18 via the valve V1 to make up for the water loss through evaporation, sparingly soluble salts such as calcium carbonate and ions such as calcium and magnesium present in the cooling water, now concentrated, would form scale in the cooling water as deposits on the pipe 24, the tube(s) of the heat exchanger 16 and the cooling tower 18, each of which receives the cooling water. Algae and/or microorganisms may also multiply and contribute to the clogging up of the passageway in the pipe 24, the tube(s) of the heat exchanger 16 and the cooling tower 18. Furthermore, the deposits on the pipe 24, the tube(s) of the heat exchanger 16 and the cooling tower 18 will encourage further growth of algae and/or microorganisms which may then cause further clogging of the passageway in the pipe 24 and the tube(s) of the heat exchanger 16 and the cooling tower 18 thus reducing the heat transfer efficiency between the hot stream of water and the cooling water. In the event where the passageway in the pipe 24 and the tube(s) of the heat exchanger 16 and the cooling tower 18 are too clogged up substantially reducing or impeding the flow of the cooling water therethrough, the pipe 24, the tube(s) of the heat exchanger 16 and the cooling tower 18 will have to be cleaned by using hazardous chemicals or be replaced prematurely.

As mentioned above, the system 10 is for use with the cooling water recirculation system 12 for regulating conductivity of the cooling water in the recirculation route R1 of the cooling water recirculation system 12 for removing scale from the cooling water, which will at least alleviate the problem of deposits or scale forming on the pipe 24, the tube(s) of the heat exchanger 16 and the cooling tower 18.

Referring to FIGS. 1A and 1B, the system 10 comprises an electrolytic device 14, a controller 28, a pump P2, a valve V2, a valve V3, an inflow line 30, an outflow line 32, a discharge pipe 34, a conductivity probe 36 and a temperature sensor (not shown). The inflow line 30 and the outflow line 32 are typically in the form of pipes.

The electrolytic device 14 comprises an electrolytic chamber 38, a pair of electrodes namely a first electrode 40a and a second electrode 40b and a power source such as in the form of a direct current (DC) power supply 41. The electrolytic chamber 38 is for receiving the cooling water and houses the first and second electrodes 40a, 40b, each of which is connected to the DC power supply 41. The DC power supply 41 is for applying a voltage between the first electrode 40a and the second electrode 40b for carrying out electrolysis of the cooling water.

The electrolytic chamber 38 comprises a conical hopper 42 at the base of the electrolytic chamber 38 for storing or holding scale that has been removed for subsequent discharge or dispensation from the electrolytic chamber 38. The scale is discharged with the cooling water through the discharge pipe 34 via the valve V3. The discharge pipe 34 is connected to the conical hopper 42 at the base of the electrolytic chamber 38. It would be understood that the electrolytic device 14 can have more than the one pair of electrodes 40a, 40b described above.

The system 10 is connected to the cooling water recirculation system 12 through the inflow line 30 via the pump P2 and through the outflow line 32 via the valve V2. In particular, one end of the inflow line 30 is connected to a portion of the cooling tower 18 of the cooling water recirculation system 12 whilst the other end of the inflow line 30 is connected to a portion of the electrolytic chamber 38. Similarly, one end of the outflow line 32 is connected to a portion of the cooling tower 18 of the cooling water recirculation system 12 whilst the other end of the outflow line 32 is connected to a portion of the electrolytic chamber 38. The electrolytic chamber 38 is airtight and gases that are produced during the electrolysis process can only leave the electrolytic chamber 38 through the outflow line 32 that is connected to the electrolytic chamber 38.

The inflow line 30 is for supplying the cooling water from the cooling tower 18 into the electrolytic chamber 38 of the electrolytic device 14 for electrolysis and the outflow line 32 is for returning the cooling water that is being electrolyzed in the electrolytic chamber 38 back to the cooling tower 18 and as such back to the recirculation route R1 of the cooling water recirculation system 12 for circulation. The inflow line 30, the electrolytic chamber 38 and the outflow line 32 forms or constitute a bypass route R2. The controller 28 is connected to the DC power supply 41 and is for controlling the electrolysis of the cooling water in the electrolytic chamber 38 for depositing ions in the cooling water as scale (not shown) on the surface of one of the pair of electrodes 40a, 40b and for dislodging the scale deposited thereon, monitoring a value of voltage and a value of current between the pair of electrodes 40a, 40b, calculating a conductivity of the cooling water based on the monitored values of voltage and current and regulating an amount of discharge of the cooling water from the electrolytic chamber 38 and/or current applied for the electrolysis of the cooling water based on the calculated conductivity of the cooling water. The current applied or applied current is also known as the amperage.

The controller 28 comprises a switching device (not shown) for switching or reversing the polarities of the first and second electrodes 40a, 40b for dislodging the scale deposited on the surface of either one of the pair of electrodes 40a, 40b. The dislodged scale is then stored or held at the conical hopper 42 of the electrolytic chamber 38 for subsequent discharge or dispensation from the electrolytic chamber 38 through the discharge pipe 34 via the valve V3. The switching device comprises a timer (not shown) for alternately switching the polarities of the pair of electrodes 40a, 40b at a predetermined time interval. For example, if the predetermined time interval is set at 90 minutes, the timer would enable the polarities of the pair of electrodes 40a, 40b to switch every 90 minutes.

The controller 28 further comprises a conductivity device (not shown) for monitoring and regulating the conductivity of the cooling water by monitoring the value of voltage and the value of current between the pair of electrodes 40a, 40b, calculating the conductivity of the cooling water based on the monitored values of voltage and current and regulating the amount of discharge of the cooling water from the electrolytic chamber 38 by regulating the duration of discharge of the cooling water based on the calculated conductivity of the cooling water. In particular, the conductivity device monitors the value of voltage and the value of current between the first and second electrodes 40a, 40b at a predetermined time interval, which is typically about one to three hours, during electrolysis and computes or calculates the conductivity of the cooling water based on the monitored values of voltage and current. It would be understood that the predetermined time interval for monitoring the values of voltage and current between the pair of electrodes 40a, 40b is not limited to the typical one to three hours mentioned above and can vary depending on the duration of electrolysis of the cooling water.

The conductivity device regulates the duration of discharge of the cooling water based on the calculated conductivity of the cooling water by increasing the duration of discharge of the cooling water from the electrolytic chamber 38 when the calculated conductivity of the cooling water exceeds a predetermined value of conductivity, and by decreasing the duration of discharge of the cooling water from the electrolytic chamber 38 when the calculated conductivity of the cooling water falls below the predetermined value of conductivity. In other words, depending on the calculated conductivity of the cooling water calculated by the conductivity device, the conductivity device of the controller 28 will provide an output signal 44 to open the valve V3 over a period of time for discharging the cooling water in the electrolytic chamber 38 through the discharge pipe 34 in response to the calculated conductivity. The duration of the valve V3 being open will be longer in response to a high conductivity value calculated whilst the duration of the valve V3 being open will be shorter in response to a low conductivity value calculated. In the event of an unexpected surge of conductivity which exceeds the predetermined conductivity value, the valve V3 will be kept open until the conductivity value reaches a value below the predetermined value. The predetermined value of conductivity can be set in the range of 700 to 2500 µS/cm.

With this conductivity device, the conductivity or hardness of water can be monitored and regulated without the need for providing a separate meter. In addition, a predetermined conductivity value can be set in the conductivity device to monitor the condition of the first and second electrodes 40a, 40b, such as the wear and tear of the electrodes 40a, 40b. As such, when the conductivity device detects this predetermined conductivity value, an output signal can be sent to alert an operator of the system 10 that the electrodes 40a, 40b are to be cleaned or replaced.

As described above, the system 10 comprises the conductivity probe 36. As shown in FIG. 1B, the conductivity probe 36 is provided along the outflow line 32 between the valve V2 and the electrolytic chamber 38. The conductivity probe 36 is for controlling the valve V2, regulating or controlling current applied for electrolysis of the cooling water and providing an input 46 to the controller 28. Although without the conductivity probe 36 the system 10 can still be used with the cooling water recirculation system 12 for regulating conductivity of the cooling water in the recirculation route R1 of the cooling water recirculation system 12 for removing scale from the cooling water, it is advantageous for the system 10 to comprise the conductivity probe 36 because by being able to regulate the current applied for electrolysis of the cooling water it would be possible to prevent over or under electrolyzing the cooling water.

The conductivity probe 36 regulates the current applied for electrolysis of the cooling water by measuring a conductivity of the cooling water along the outflow line 32 and providing the input 46 of the measured conductivity to the controller 28 for regulating the current applied for electrolysis based on the input 46 of the measured conductivity. The conductivity probe 36 can comprise a sensor or the like for measuring the conductivity of the cooling water along the outflow line 32. The measurement of the conductivity of the cooling water by the conductivity probe 36 can be carried out continuously.

The controller 28 further comprises an auto mechanism (not shown) to receive the input 46 of the measured conductivity and to regulate the current applied for electrolysis of the cooling water based on the input 46 of the measured conductivity value received from the conductivity probe 36. The auto mechanism of the controller 28 regulates the current applied for electrolysis of the cooling water by providing an output 48 to the DC power supply 41 to increase the current applied for electrolysis of the cooling water when the input 46 of the measured conductivity received from the conductivity probe 36 exceeds a predetermined value of conductivity, or to decrease the current applied for electrolysis of the cooling water when the input 46 of the measured conductivity received from the conductivity probe 36 falls below the predetermined value of conductivity. The predetermined value of conductivity can be set in the range of 700 to 2500 μS/cm.

In this way, the conductivity of the cooling water can be easily regulated to fall within the desirable range without over or under electrolyzing the cooling water. This is advantageous because over electrolyzing may cause pipe leakage especially pipes which are old, while under electrolyzing may lead to the deposit of scale in the pipe 24, the tube(s) of the heat exchanger 16 and the cooling tower 18 of the cooling water recirculation system 12. Thus, with the regulation of the current applied for electrolysis, the operation performance of the system 10, the operation costs and the life span of the electrodes 40a, 40b can be optimized.

Electrolytic processing of the cooling water based on the system 10 increases the solubility of ions and/or sparingly soluble salts in the cooling water and may enable the removal of existing scale that may have been deposited on or precipitated in the pipe 24, the tube(s) of the heat exchanger 16 and the cooling tower 18. This electrolytic processing of the cooling water also prevents scale from re-depositing on the pipe 24, the tube(s) of the heat exchanger 16 and the cooling tower 18. The conductivity of the cooling water in the cooling water recirculation system 12 will increase initially as any existing scale is being dissolved and subsequently maintained at a certain range of equilibrium conductivity values such as in the range of 700 to 2500 μS/cm by discharging a portion of the cooling water that is being electrolyzed.

However, there must be a balance struck between the amount of electrolyzed cooling water to be discharged and the dissolving power of the cooling water that is electrolyzed. Over discharging will decrease the dissolving power of the electrolyzed cooling water and under discharging will cause the conductivity of the cooling water to increase to an undesirable level. This balance is achieved by the above described regulation of the amount of discharge of the cooling water from the electrolytic chamber 38 based on the calculated conductivity of the cooling water.

As described above, the system 10 also comprises the temperature sensor (not shown). The temperature sensor is provided in the electrolytic chamber 38 for measuring a temperature in the electrolytic chamber 38. If the temperature measured is not at 25° C., the conductivity of the cooling water will be temperature compensated to 25° C.

In addition, the system 10 can further comprise a strainer 50, a flow meter 52, a flow totaliser 54 and isolating valves V4, V5 as shown in FIG. 1B. The strainer 50 is provided along the inflow line 30 between the cooling tower 18 and the pump P2 and is for straining the cooling water that passes through the inflow line 30. The strainer 50 acts as a filter to retain at least some larger particles or solids present in the cooling water so that the cooling water that flows to the pump P2 is free from or has less of such particles or solids.

The flow meter 52 is also provided along the inflow line 30 but is provided between the pump P2 and the electrolytic chamber 38. The flow meter 52 is for measuring the rate of flow of water that is being fed or supplied to the electrolytic chamber 38.

The flow totaliser 54 is provided along the discharge pipe 34 and is located between the conical hopper 42 of the electrolytic chamber 38 and the valve V3. The flow totaliser 54 is for computing or calculating the accumulated or total amount of volume of the cooling water that is discharged through the discharge pipe 34 via the valve V3.

The isolating valve V4 is provided between the cooling tower 18 and the strainer 50 along the inflow line 30. The isolating valve V5 is also provided along the inflow line 30 but between the pump P2 and the flow meter 52. The isolating valves V4, V5 are for isolating certain sections of the bypass route R2 to facilitate removal of the whole system 10 or certain parts of the system 10 from the cooling water recirculation system 12 such as for maintenance of the system 10 or replacement of certain parts of the system 10 without having to stop the operation of the cooling water recirculation system 12.

The system 10 when connected to the cooling water recirculation system 12 operates as described hereinafter. Firstly, when the cooling water exits the cooling tower 18, a portion of the cooling water circulating through the cooling tower 18 is now directed or supplied to the electrolytic chamber 38 of the electrolytic device 14 through the inflow line 30 by the operation of the pump P2. The remaining portion of the cooling water circulating through the cooling tower 18 is directed or supplied to the pipe 24 for circulation in the recirculation route R1.

In the electrolytic chamber 38, a direct current voltage is applied between the first electrode 40a and the second electrode 40b for electrolyzing the cooling water received therein controlled by the controller 28. During this electrolysis process (hereinafter referred to as the electrolytic step), ions contained in the cooling water such as calcium and magnesium ions are gradually deposited as scale on the surface of either the first electrode 40a or the second electrode 40b depending on which is the cathode. The ions are thereby removed from the cooling water. The electrolytic step is carried out over a predetermined duration such as one to three hours during which the valve V2 is open for returning the cooling water that is electrolyzed back to the cooling tower 18 through the outflow line 32 and the valve V3 is closed. The cooling water from the cooling tower 18 is constantly or continuously supplied to the electrolytic chamber 38 through the inflow line 30 and the cooling water from the electrolytic chamber 38 is constantly or continuously returned to the cooling tower 18 through the outflow line 32 during the entire duration of the electrolytic step. The cooling water that is returned to the cooling tower 18 through the outflow line 32 rejoins the recirculation route R1 for circulation in the cooling water recirculation system 12. The predetermined duration of the electrolytic step is not limited to only one to three hours and can vary depending on the quality or hardness of the cooling water. For example, if the cooling water contains a high amount of mineral contents, the electrolytic step will be carried out for a shorter duration as compared to if the cooling water contains a lower amount of mineral contents.

During the electrolytic step, gases such hydrogen, oxygen and carbon dioxide are also produced. Such gases are diluted with the air introduced by the cooling tower 18 and are released from the system 10 through the outflow line 32 and discharged into the atmosphere.

After the elapse of the predetermined duration of the electrolytic step, the polarities of the first electrode 40a and the second electrode 40b are switched or reversed (hereinafter known as the polarity reversal step). In other words, if the second electrode 40b was initially the cathode and the first electrode 40a was initially the anode in the electrolytic step, the second electrode 40b will now become the anode and the first electrode 40a will now become the cathode after the polarity reversal in the polarity reversal step.

In the polarity reversal step, the pump P2 is stopped to stop the supply of the cooling water from the cooling tower 18 to the electrolytic chamber 38 of the bypass route R2 and the valves V2 and V3 are closed. The switching device of the controller 28 then controls a voltage from the DC power supply 41 to reverse or switch the polarities of the first electrode 40a and the second electrode 40b. Taking from the above example where the first electrode 40a was initially the anode and the second electrode 40b was initially the cathode in the electrolytic step, the first electrode 40a and the second electrode 40b are now set as the cathode and the anode, respectively, in the polarity reversal step. The scale deposited on the initial cathode is dislodged from the surface thereof and is collected at the conical hopper 42 provided at the base of the electrolytic chamber 38. The polarity reversal step is carried out over a short period such as half a minute to one minute.

After the polarity reversal step is carried out, the dislodged scale and the cooling water is discharged from the electrolytic chamber 38 through the discharge pipe 34 via the valve V3 (hereinafter known as the discharge step). In the discharge step, the pump P2 is switched on, the valve V3 opens and the valve V2 is closed. As a result, the dislodged scale together with the cooling water in the electrolytic chamber 38 is discharged and removed from the system 10 whilst the cooling water from the cooling tower is continuously supplied to the electrolytic chamber 38. The duration of the opening of the valve V3 is dependent on the calculated conductivity of the cooling water calculated by the conductivity device of the controller 28. The duration of the valve V3 being open will be longer in response to a high conductivity value calculated whilst the duration of, the valve V3 being open will be shorter in response to a low conductivity calculated. The typical duration of the discharge step is about one to ten minutes. However, it is not limited to this range and can vary according to the calculated conductivity of the cooling water.

After the discharge step is carried out, the electrolytic step as described above takes place for a predetermined duration and the valve V2 is now open while the valve V3 is now closed in the electrolytic step. The pump P2 remains switched on during the electrolytic step. The only time the pump P2 is switched off is at the polarity reversal step. After the electrolytic step, the polarity reversal step is carried out followed by the discharge step. These three steps are repeated continuously in the order of the following sequence: the electrolytic step, the polarity reversal step, the discharge step.

It would be appreciated that the system 10 can be removed or disconnected from the cooling water recirculation system 12 to be a standalone system. Advantageously, as described above the system 10 or certain parts of the system 10 can be removed from the cooling water recirculation system 12 when maintenance is required to be carried out on the system 10 or certain parts of the system 10 such as the electrolytic device 14 and the pair of electrodes 40a, 40b. During such maintenance, the cooling water recirculation system 12 can continue to operate without the need for shutting down the entire cooling water recirculation system 12.

The system 10 regulates conductivity by regulating the amount of discharge of the cooling water from the electrolytic chamber 38 and the current applied for the electrolysis of the cooling water based on the calculated conductivity of the cooling water. This has the advantage of substantially prolonging the life span of the first and second electrodes 40a, 40b, which would typically be consumed very quickly and require frequent replacements in a conventional system for electrolysis. The reduction in the oxidation-reduction potential value by electrolysis of the cooling water slows down the rate of corrosion of the pipe 24 and the tube(s) of the heat exchanger 16.

Furthermore, the system 10 is able to run continuously even where the conductivity of the cooling water exceeds a threshold value, such as in a situation where there is an abrupt increase in the concentration of dissolved solids, ions and/or sparingly soluble salts or hardness of the cooling water caused by intense evaporation or an unexpected surge in evaporation of the water in the cooling tower 18. Examples that cause such intense evaporation or unexpected surges in evaporation include changes in temperature settings at the source such as the production floor of a factory, changes in climatic conditions such as dry/wet bulb temperatures and the like.

In such situations, a conventional system will have to be stopped and the cooling water has to be changed before such a system can work again. Advantageously, the system 10 being able to regulate conductivity of the cooling water in the recirculation route R2 of the cooling water recirculation system 12 for removing scale from the cooling water and also to run continuously even where the conductivity of the cooling water exceeds a threshold value helps to save water and electricity making the system 10 a sustainable and environmentally friendly system. In particular, a predetermined conductivity value is set in the conductivity device of the controller 28. If the conductivity device detects that the conductivity of the cooling water exceeds this predetermined value, it is an indication that the electrolytic device 14 alone is unable to cope with the situation and will automatically activate or open the valve V3 to discharge a portion of the cooling water from the electrolysis chamber 38 through the discharge pipe 34. At the same time, the valve V1 of the cooling water recirculation system 12 will open to feed or supply fresh water to the cooling tower 18 through the pipe 26. The predetermined value of conductivity can be set at a value in the range of 700-2500 μS/m.

In accordance with another aspect of an embodiment of the invention, there is described a method for regulating conductivity of the cooling water in the recirculation route R1 of the cooling water recirculation system 12 for removing scale from the cooling water with reference to FIGS. 2A to 2D and FIGS. 3A to 3D.

Figure 2A:
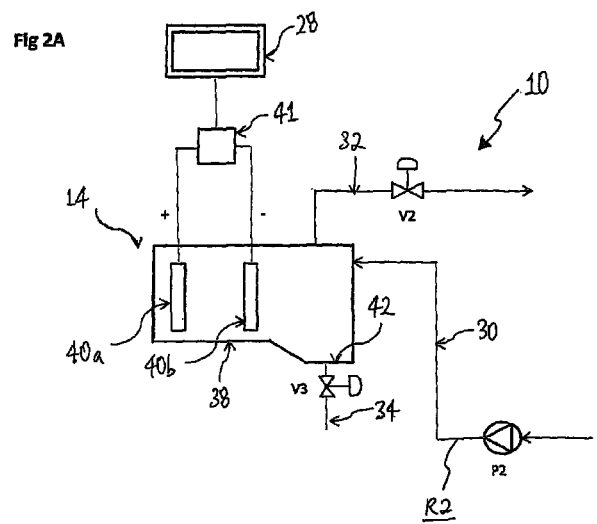
FIG. 2A is a schematic illustration of the system of FIG. 1A when a portion of the cooling water from the cooling tower of the cooling water recirculation system is introduced into an electrolytic chamber of an electrolytic device of the system according to a method for regulating conductivity of the cooling water of the cooling water recirculation system.

FIG. 2A is a schematic illustration of the system 10 when the cooling water is introduced or supplied into the electrolytic chamber 38 of the bypass route R2. The method comprises the step of intaking the cooling water from the cooling tower 18 into the electrolytic chamber 38. The cooling water is directed to the electrolytic chamber 38 through the inflow line 30 with the help of the pump P2.

Figure 2B:
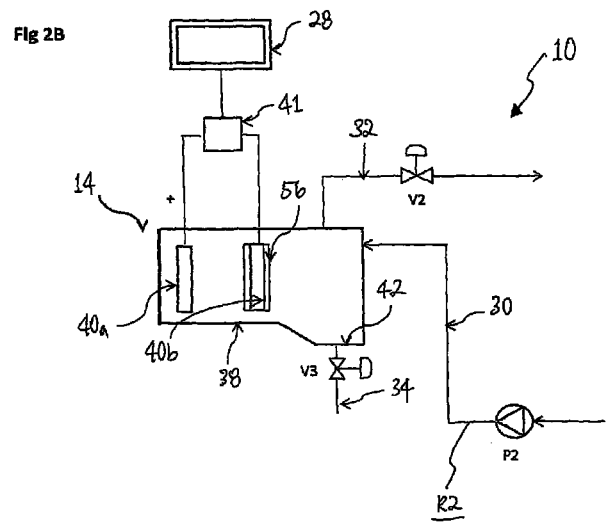
FIG. 2B is a schematic illustration of the system of FIG. 2A which shows the deposition of ions or scale on the surface of the second electrode of the electrolytic device.

After the cooling water is pumped into the electrolytic chamber 38, the step of applying a voltage between the pair of electrodes 40a, 40b takes place for electrolyzing the cooling water. At this step, the valve V2 is open while the valve V3 is closed or shut. After the step of applying the voltage, the step of controlling the electrolysis of the cooling water in the electrolytic chamber 38 controlled by the controller 28 for depositing ions in the cooling water as scale on the surface of either the first electrode 40a or the second electrode 40b takes place. In this described embodiment, the voltage is applied such that the first electrode 40a is positively charged, which behaves as the anode, and the second electrode 40b is negatively charged, which behaves as the cathode. FIG. 2B shows the deposition of ions or scale 56 on the surface of the second electrode 40b, which behaves as the cathode. The ions that typically cause scaling are namely calcium and magnesium ions, which are present in the cooling water. By electrolyzing the cooling water in such a manner, such ions that are present are hence removed from the cooling water without the traditional use of chemicals which may be harmful to the environment.

The electrolysis of the cooling water is allowed to continue for a predetermined time interval or duration, for example for about one to three hours, depending on the quality or hardness of the cooling water, and the scale 56 is gradually deposited on the surface of the second electrode 40b over this period. The electrolyzed cooling water is then directed or returned to the cooling tower 18 through the outflow line 32 or also known as the returning pipe 32 via the valve V2 which is open. The opening and closing of the valve V2 is controlled by the conductivity probe 36.

During electrolysis of the cooling water, the step of monitoring a value of voltage and a value of current between the pair of electrodes 40a, 40b takes place, followed by the step of calculating a conductivity of the cooling water based on the monitored values of voltage and current. The monitoring step and the calculating step are both carried out by the conductivity device of the controller 28.

Once the predetermined time interval or duration for electrolysis of the cooling water is up, the step of switching the polarities of the pair of electrodes 40a, 40b by the switching device of the controller 28 takes place for a predetermined duration of about half a minute to one minute. In other words, the polarity of the cathode (the second electrode 40b) and the anode (the first electrode 40a) is reversed. The switching device of controller 28 controls a voltage from the DC power supply 41 and a DC voltage is applied to the first and second electrodes 40a, 40b to set the first electrode 40a and the second electrode 40b as the cathode and the anode, respectively, as shown in FIG. 2C. By virtue of this polarity reversal, the second electrode 40b is now the anode, which is positively charged, thus allowing the scale 56 deposited on the surface of the second electrode 40b to be dislodged therefrom. During this polarity reversal, the valves V2 and V3 are closed, and the pump P2 is automatically switched off to stop the supply of the cooling water from the cooling tower 18 to the electrolytic chamber 38.

The scale 56 that is dislodged from the second electrode 40b is collected at the conical hopper 42 as shown in FIG. 2D for subsequent discharge from the electrolytic chamber 38. After the scale 56 is dislodged, the step of regulating an amount of discharge of the cooling water from the electrolytic chamber 38 based on the calculated conductivity of the cooling water takes place. The regulation of the amount of discharge is carried out by the conductivity device of the controller 28. The step of regulating the amount of discharge comprises regulating the duration of discharge of the cooling water based on the calculated conductivity value of the cooling water. The conductivity device regulates the duration of discharge of the cooling water based on the calculated conductivity of the cooling water by increasing the duration of discharge of the cooling water from the electrolytic chamber 38 when the calculated conductivity of the cooling water exceeds a predetermined value of conductivity, and by decreasing the duration of discharge of the cooling water from the electrolytic chamber 38 when the calculated conductivity of the cooling water falls below the predetermined value of conductivity.

After the predetermined duration of the polarity reversal of the electrodes 40a, 40b is up, the pump P2 is switched on for supplying the cooling water from the cooling tower 18 into the electrolytic chamber 38 and the valve V3 is open for a predetermined duration based on the calculated conductivity of the cooling water for discharging the scale 56 together with the cooling water in the electrolytic chamber 38 through the discharge pipe 34. The valve V2 is closed throughout the predetermined duration of the discharge.

Once the predetermined duration of the discharge is up, the electrolysis process as described above is now repeated except that the first electrode 40a is now the cathode and the second electrode 40b is now the anode. FIGS. 3A to 3D show the steps similar to the steps as shown in FIGS. 2A to 2D. The only difference is that as the first electrode 40a is now the cathode, which is negatively charged, the deposition of ions or scale 58 is now on the surface of the first electrode 40a instead of the second electrode 40b.

Figure 3A:
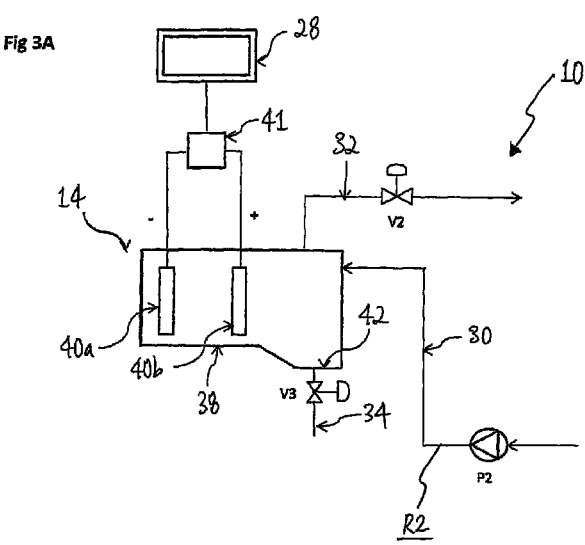
FIG. 3A is a repeat of the system of FIG. 2A according to the method for regulating conductivity of the cooling water of the cooling water recirculation system.
Figure 3B:
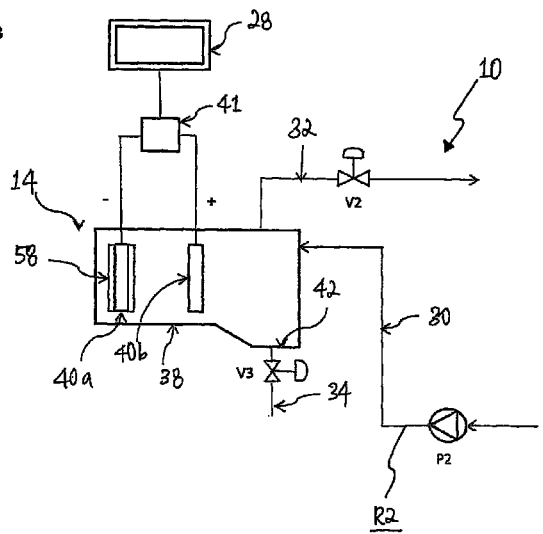
FIG. 3B is a schematic illustration of the system of FIG. 3A which shows the deposition of ions or scale on the surface of the first electrode of the electrolytic device.

FIG. 3A is a schematic illustration of the system 10 when the cooling water is introduced or supplied into the electrolytic chamber 38 of the bypass route R2 through the inflow line 30 with the help of the pump P2. Similarly, the electrolysis of the cooling water is allowed to continue for a predetermined time interval and the scale 58 is gradually deposited on the surface of the first electrode 40a over this period as shown in FIG. 3B. Once the predetermined time interval is up, the polarity of the cathode (the first electrode 40a) and the anode (the second electrode 40b) is reversed by the switching device of the controller 28. During the polarity reversal, the pump P2 is switched off to stop the supply of the cooling water from the cooling tower 18 to the electrolytic chamber 38 and both the valves V2 and V3 are closed.

By virtue of this polarity reversal, the first electrode 40*a* is now the anode, which is positively charged, thus allowing the scale 58 deposited on the surface of the first electrode 40*a* to be dislodged therefrom as shown in FIG. 3C. The scale 58 that is dislodged from the first electrode 40*a* is collected at the conical hopper 42 and is discharged from the electrolytic chamber 38 together with the cooling water in the electrolytic chamber 38 through the discharge pipe 34 via the valve V3 as shown in FIG. 3D. As described above, the valve V3 is open for a predetermined duration based on the calculated conductivity of the cooling water. During the opening of the valve V3, the valve V2 remains closed but the pump P2 is switched on for supplying the cooling water from the cooling tower 18 to the electrolytic chamber 38.

The complete process of scale removal or also known as the descaling process is achieved or accomplished by repeating the above described, steps or polarity reversal cycle at the predetermined time intervals continuously. The dissolved solids, ions and/or sparingly soluble salts including minerals present in the cooling water are consequently removed from the cooling water thereby reducing the harness thereof, which prevents scale from forming in the pipe 24, the tube(s) of the heat exchanger 16 and the cooling tower 18.

In addition, chlorine which has a sterilization effect is produced during the electrolysis process. The chlorine produced will be present in the electrolyzed water which enables the prevention of algae and/or microorganisms propagation in the open recirculation cooling water system 12. As such, bio fouling caused by algae and/or microorganisms can be substantially reduced without using hazardous chemicals.

During the electrolysis of the cooling water in the electrolytic chamber 38, the regulation of the current applied for electrolysis can also be carried out to prevent over or under electrolyzing the cooling water. The step of regulating the current applied for electrolysis of the cooling water is based on measuring a conductivity of the cooling water along the outflow line 32 and providing an input of the measured conductivity, which is carried out by the conductivity probe 36, and receiving the input of the measured conductivity and regulating the current applied for electrolysis based on the input of the measured conductivity, which is carried out by the auto mechanism of the controller 28. The auto mechanism of the controller 28 regulates the current applied for electrolysis of the cooling water by providing an output to the DC power supply 41 to increase the current applied for electrolysis of the cooling water when the input of the measured conductivity received from the conductivity probe 36 exceeds a predetermined value of conductivity, or to decrease the current applied for electrolysis of the cooling water when the input of the measured conductivity received from the conductivity probe 36 falls below the predetermined value of conductivity. The predetermined value of conductivity can be set in the range of 700 to 2500 μS/cm.

The method also comprises a step of measuring a temperature within the electrolytic chamber 38. If the measured temperature is not at 25° C., the conductivity of the cooling water is temperature compensated to 25° C.

Various modifications will be apparent to those skilled in the art. For example, the conductivity device can regulate the amount of discharge of the cooling water by regulating the flow rate of the discharge instead of by regulating the duration of discharge of the cooling water.

The conductivity device can also regulate the amount of inflow of the cooling water by regulating the flow rate of the pump P2. This is advantageous as such a regulation would help to save electricity by saving power to operate the pump P2.

Instead of having the predetermined value of conductivity set at a particular value which is in the range of 700 to 2500 μS/cm, the predetermined value of conductivity can comprise of a lower limit and an upper limit. For example, the lower limit can be set at a conductivity value of 700 μS/cm and the upper limit can be set at a conductivity value of 2500 μS/cm. It would be understood that the lower limit and the upper limit are not restricted to the conductivity values of 700 μS/cm and 2500 μS/cm respectively. The lower limit and the upper limit can be set at any conductivity value as long as the value is in the range of 700 μS/cm to 2500 μS/cm.

Although the foregoing invention has been described in some detail by way of illustration and example, and with regard to one or more embodiments, for the purposes of clarity of understanding, it is readily apparent to those of ordinary skill in the art in light of the teachings of this invention that certain changes, variations and modifications may be made thereto without departing from the spirit or scope of the invention as described in the appended claims.

It would be further appreciated that although the invention covers individual embodiments, it also includes combinations of the embodiments discussed. For example, the features described in one embodiment is not being mutually exclusive to a feature described in another embodiment, and may be combined to form yet further embodiments of the invention.

The invention claimed is:

1. A system for regulating conductivity of cooling water in a recirculation route of a cooling water recirculation system through which the cooling water is circulated for removing scale from the cooling water, comprising:
   an electrolytic device connectable to the cooling water recirculation system for performing electrolysis on the cooling water, the electrolytic device having an electrolytic chamber for receiving the cooling water, a pair of electrodes disposed in the electrolytic chamber and a power source for applying a voltage between the pair of electrodes; and
   a controller connected to the power source, for:
      controlling the electrolysis of the cooling water in the electrolytic chamber for depositing ions in the cooling water as scale on the surface of one of the pair of electrodes and for dislodging the scale deposited thereon;
      monitoring a value of voltage and a value of current between the pair of electrodes;
      calculating a conductivity of the cooling water based on the monitored values of voltage and current; and
      regulating an amount of discharge of the cooling water from the electrolytic chamber based on the calculated conductivity of the cooling water,
   whereby the scale is removed with the cooling water that is being discharged and the cooling water that is being electrolyzed is directed back to the recirculation route of the cooling water recirculation system for circulation wherein the system further comprises an inflow line through which the cooling water flows into the electrolytic chamber of the electrolytic device, and an outflow line through which the cooling water that is being electrolyzed flows out from the electrolytic chamber and back to the recirculation route of the cooling water recirculation system for circulation, and a conductivity probe provided along the outflow line for regulating current applied for electrolysis of the cooling water.

2. A system according to claim 1, wherein the conductivity probe regulates the current applied for electrolysis of the cooling water by measuring a conductivity of the cooling water along the outflow line and providing an input of the measured conductivity to the controller for regulating the current applied for electrolysis based on the input of the measured conductivity.

3. A system according to claim 2, wherein the controller further comprises an auto mechanism for receiving the input of the measured conductivity and regulating the current applied for electrolysis of the cooling water based on the input of the measured conductivity to prevent over or under electrolyzing the cooling water.

4. A system according to claim 3, wherein the auto mechanism increases the current applied for electrolysis of the cooling water when the input of the measured conductivity received from the conductivity probe exceeds a predetermined value of conductivity, and decreases the current applied for electrolysis of the cooling water when the input of the measured conductivity received from the conductivity probe falls below the predetermined value of conductivity.

5. A system according to claim 1, wherein the controller comprises a switching device for switching the polarities of the pair of electrodes for dislodging the scale deposited on the surface of either one of the pair of electrodes.

6. A system according to claim 5, wherein the switching device comprises a timer for alternately switching the polarities of the pair of electrodes at a predetermined time interval.

7. A system according to claim 1, wherein the controller further comprises a conductivity device for monitoring the value of voltage and the value of current between the pair of electrodes and for calculating the conductivity of the cooling water based on the monitored values of voltage and current.

8. A system according to claim 7, wherein the conductivity device regulates the amount of discharge of the cooling water from the electrolytic chamber by regulating the duration of discharge of the cooling water based on the calculated conductivity of the cooling water.

9. A system according to claim 8, wherein the conductivity device increases the duration of discharge of the cooling water when the calculated conductivity of the cooling water exceeds a predetermined value of conductivity, and decreases the duration of discharge of the cooling water when the calculated conductivity of the cooling water falls below the predetermined value of conductivity.

10. A system according to claim 1, wherein the system further comprises a discharge outlet at the base of the electrolytic chamber for discharging the scale and the cooling water.

11. A system according to claim 1, wherein the predetermined value of conductivity is in the range of 700 to 2500 µS/cm.

12. A system according to claim 1, wherein the system further comprises a temperature sensor provided in the electrolytic chamber for measuring a temperature in the electrolytic chamber.

13. A system according to claim 12, wherein the conductivity of the cooling water is temperature compensated to 25° C.

14. A method for regulating conductivity of cooling water in a recirculation route of a cooling water recirculation system through which the cooling water is circulated for removing scale from the cooling water, comprising the steps of:

intaking the cooling water into an electrolytic chamber of an electrolytic device having a pair of electrodes disposed in the electrolytic chamber;

applying a voltage between the pair of electrodes;

controlling the electrolysis of the cooling water in the electrolytic chamber for depositing ions in the cooling water as scale on the surface of one of the pair of electrodes and for dislodging the scale deposited thereon;

monitoring a value of voltage and a value of current between the pair of electrodes;

calculating a conductivity of the cooling water based on the monitored values of voltage and current; and regulating an amount of discharge of the cooling water from the electrolytic chamber based on the calculated conductivity of the cooling water, whereby the scale is removed with the cooling water that is being discharged and the cooling water that is being electrolyzed is directed back to the recirculation route of the cooling water recirculation system for circulation, wherein the step of intaking the cooling water into the electrolytic chamber is carried out via an inflow line, and the cooling water that is being electrolyzed is directed back to the recirculation route of the cooling water recirculation system from the electrolytic chamber for circulation via an outflow line the method further comprising regulating the current applied for electrolysis of the cooling water by measuring a conductivity of the cooling water along the outflow line and providing an input of the measured conductivity for regulating the current applied for electrolysis based on the input of the measured conductivity.

15. A method according to claim 14, further comprising receiving the input of the measured conductivity and regulating the current applied for electrolysis of the cooling water based on the input of the measured conductivity to prevent over or under electrolyzing the cooling water.

16. A method according to claim 15, further comprising increasing the current applied for electrolysis of the cooling water when the input of the measured conductivity exceeds a predetermined value of conductivity, and decreasing the current applied for electrolysis of the cooling water when the input of the measured conductivity falls below the predetermined value of conductivity.

17. A method according to claim 14, wherein the step of controlling the electrolysis of the cooling water comprises switching the polarities of the pair of electrodes for dislodging the scale deposited on the surface of either one of the pair of electrodes.

18. A method according to claim 17, wherein the step of controlling the electrolysis of the cooling water further comprises alternately switching the polarities of the pair of electrodes at a predetermined time interval.

19. A method according to claim 17, wherein the step of regulating the amount of discharge comprises regulating the duration of discharge of the cooling water based on the calculated conductivity of the cooling water.

20. A method according to claim 19, wherein the step of regulating the amount of discharge further comprises the step of increasing the duration of discharge of the cooling water when the calculated conductivity of the cooling water exceeds a predetermined value of conductivity, and decreasing the duration of discharge of the cooling water when the calculated conductivity of the cooling water falls below the predetermined value of conductivity.

21. A method according to claim 17, wherein the scale is removed with the cooling water being discharged from the electrolytic chamber via a discharge outlet provided at the base of the electrolytic chamber.

22. A method according to claim 15, wherein the predetermined value of conductivity is in the range of 700 to 2500 µS/cm.

23. A method according to claim 15, further comprising measuring a temperature in the electrolytic chamber.

24. A method according to claim 23, wherein the conductivity of the cooling water is temperature compensated to 25° C.

* * * * *